United States Patent Office.

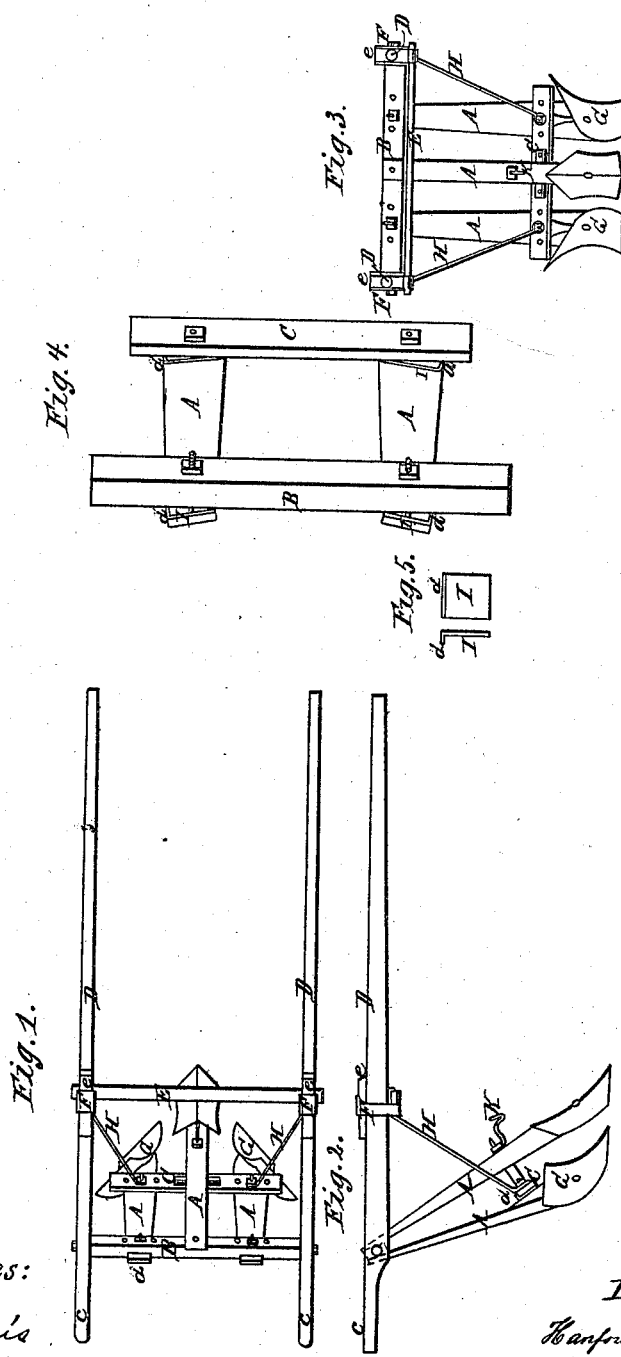

HANFORD INGRAHAM, OF NAPLES, NEW YORK.

Letters Patent No. 66,495, dated July 9, 1867.

IMPROVEMENT IN CULTIVATORS.

*The Schedule referred to in these Letters Patent and making part of the same.*

TO ALL WHOM IT MAY CONCERN:

Be it known that I, HANFORD INGRAHAM, of Naples, in the county of Ontario, State of New York, have invented a new and useful Improvement in Cultivators; and I do hereby declare that the following is a full, clear, and exact description of the construction and operation of the same, reference being had to the accompanying drawings, making a part of this specification, in which—

Figure 1 is a top view of the cultivator.

Figure 2 is a side view of the same.

Figure 3 is a front view of the same.

Figure 4, a view in detail, showing the arrangement of the plates with flanges between the standards and cross-bars, for regulating the angles of shares.

Figure 5, views of the plates with flanges.

Like letters in the different figures of the drawings indicate like parts.

The nature of my invention consists, first, in providing wooden standards of sufficient length, and so constructing and attaching the standards to thills as to dispense with the ordinary frames and handles, and iron shanks for the moulds; second, in making the moulds of much greater curve, and in the manner of regulating their depth, and angles to rows, by means of adjustable clasps and plates with flanges.

To enable others skilled in the art to make and use my invention, I will proceed to describe its construction and operation.

A A A are wooden standards, properly shaped at the bottom to receive the moulds, and are attached by bolts to movable cross-bar B at the top, and, at proper distance from the bottom, to cross-bar C. The ends of the bar B are provided with round tenons or pins, which pass through the thills D D at a proper distance from the rear ends thereof, so as to form the handles $c\ c$, while the cross-tie or slide-bar E, by means of the adjustable clasps F F, secures and regulates the width of the forward ends of the thills. G G are double-pointed, right-and-left moulds or shares, and are of much greater curve than any now in use. The rods H H, attached to the bar C and to the clasps F F, serve to support the thills and standards, and, in combination with the clasps F F, regulate the depth of the shares. Cast-iron plates I I I I, with flanges $d\ d\ d\ d$, are placed between the standards and cross-bars, and, being adjustable, may be changed to either side, for the purpose of regulating the angles of the shares to cut narrow or wide furrows, or do much or little hilling, as required. (See figs. 4 and 5, which represent the plates, and the manner of arranging them.) The draught is attached to hook K, attached to the middle standard. The depth of the shares is increased by moving the clasps F F backward, and lessened by moving them forward, and the clasps are secured by wedges $e\ e$.

The standards being made of wood, and constructed and arranged as described, so as to dispense with iron shanks, and frames for carrying and supporting the shares and handles, these cultivators can be made at considerably less expense than those now in use, and at the same time possess some superior qualities. The moulds G G are given a much greater curve, so that the lower parts, which form the shares or cutting edges, are nearly horizontal, and thus more readily cut the weeds and grass, while the upper parts of the moulds more completely turn them under and cover them, and at the same time place the dirt in better shape to the hills or rows.

Having thus fully described my invention, what I claim therein as new, and desire to secure by Letters Patent, is—

1. The arrangement of the standards and cross-bars with the moulds or shares as constructed, in combination with the thills, substantially in the manner and for the purposes as herein described.

2. The adjustment of the shares to the required angle, by means of adjustable plates, with flanges, substantially in the manner and for the purpose as herein described.

3. The adjustable clasps in combination with cross-bar E, the thills, rods, standards, and shares, substantially in the manner and for the purposes as herein described.

HANFORD INGRAHAM.

Witnesses:
L. G. THRALL,
V. O. HART.